United States Patent [19]

Mayer

[11] 3,994,796

[45] Nov. 30, 1976

[54] ELECTROLYTIC PLATING APPARATUS FOR DISCRETE MICROSIZED PARTICLES

[75] Inventor: Anton Mayer, Los Alamos, N. Mex.

[73] Assignee: The United States of America as represented by the United States Energy Research and Development Administration, Washington, D.C.

[22] Filed: Sept. 11, 1975

[21] Appl. No.: 612,393

[52] U.S. Cl. .............................. 204/223; 204/273; 204/275
[51] Int. Cl.² ...................... C25D 5/08; C25D 21/10
[58] Field of Search ............ 204/222, 273, 275, 23, 204/223

[56] References Cited
UNITED STATES PATENTS

| | | | |
|---|---|---|---|
| 1,051,556 | 1/1913 | Consigliere | 204/36 |
| 3,577,324 | 5/1971 | Patterson | 204/222 |
| 3,654,098 | 8/1972 | Backhurst | 204/222 |
| 3,703,446 | 11/1972 | Haycock | 204/222 |
| 3,716,459 | 2/1973 | Salter et al. | 204/23 |
| 3,941,669 | 2/1976 | Bharucha | 204/222 |

OTHER PUBLICATIONS

Lawrence Berkeley Laboratory Report LBL-3530 Inorganic Materials Research Division Annual Report 1974 pp. 151, 152, 174 and 175.

Primary Examiner—T. M. Tufariello
Attorney, Agent, or Firm—Dean E. Carlson; Edward C. Walterscheid

[57] ABSTRACT

Method and apparatus are disclosed for electrolytically producing very uniform coatings of a desired material on discrete microsized particles. Agglomeration or bridging of the particles during the deposition process is prevented by imparting a sufficiently random motion to the particles that they are not in contact with a powered cathode for a time sufficient for such to occur.

4 Claims, 2 Drawing Figures

3,994,796

ELECTROLYTIC PLATING APPARATUS FOR DISCRETE MICROSIZED PARTICLES

BACKGROUND OF THE INVENTION

This invention relates to a method and apparatus for forming uniformly thick coatings on discrete microsized particles and more particularly to an electrolytic method and apparatus for applying such coatings on discrete microsized particles.

A mixture of deuterium (D) and tritium (T) is a preferred fuel for laser fusion, primarily because the least energy is required to cause these two isotopes to undergo thermonuclear reaction. It is desirable that the DT mixture acted upon by the laser radiation be as dense as possible. The optimum density is achieved by cooling the mixture sufficiently that it becomes a solid. This, however, requires temperatures below 20 K which imposes very severe constraints not only on the manufacture, but also on the handling of laser fusion targets.

Alternatively, hollow, spherical, DT-gas-filled targets with diameters ranging from 30 to greater than 200 $\mu$m and with contained fuel pressures varying from 10 to 1000 atm (at 298 K) are of interest for laser fusion. The primary gas-containment vessels of these targets are hollow microspheres called microcapsules The targets are filled by diffusing DT fuel gas through the walls at elevated temperatures, taking advantage of the exponential temperature dependence of the permeability to allow the gas to be retained for useful times at room temperature. Thus, when the microcapsules are placed in a deuterium and tritium gas mixture of a desired ratio at high pressure and elevated temperature, the deuterium and tritium readily enter the microcapsules and equilibrate to the surrounding gas pressure. When the microcapsules are cooled to room temperature, the diffusion rate through their walls is greatly reduced, so that the DT mixture within the microcapsules remains at high pressure for times which permit useful storage before the targets are irradiated by the laser.

To most effectively produce the compression of the DT fuel necessary for thermonuclear reaction, it is desirable that the fuel be surrounded by a pusher shell of high-Z metal. Presently available microcapsules are not composed of materials having the desired high-Z characteristics, so that it is necessary to coat them with a thin layer of high-Z metal. This metal shell of the laser fusion target must be fully dense and of very uniform thickness, with aspect ratios in the range of 10 to 1. It should have a minimum tensile strength of 690 MPa.

It is well known in the art that electrolytic techniques are well suited to the deposition or plating of metals on various surfaces and to the precise control of the thickness of the resultant coatings. Unfortunately, conventional electrolytic plating apparatus and methods have been found to be largely unsuccessful in producing metal coatings of the requisite thickness and uniformity requirements on microcapsules. A primary problem has been the tendency of the microcapsules to agglomerate and/or bridge during the coating process. By bridging is meant the joinder of the coatings of two or more microcapsules to form one common structure.

SUMMARY OF THE INVENTION

Agglomeration or bridging of discrete microsized particles subjected to electrolytic coating techniques is avoided and coatings of very uniform thickness are achieved by imparting a sufficiently random motion to the particles in a solution of a desired electrolyte which regularly brings them into contact with the powered cathode of the electrolytic coating apparatus for a time insufficient for agglomeration or bridging to occur between the particles. In a preferred embodiment, the particles to be coated are placed in an elongated container having porous walls with opposed screened openings therein. The interstices of the screens permit a substantially free flow of the electrolytic solution therethrough but do not allow the particles to pass therethrough. Two cathodes are disposed within this container, with one being adjacent one screened opening and the other adjacent to the second screened opening. Also disposed within the container are a plurality of inert beads which have diameters substantially larger than those of the particles to be coated. The container is submerged within the electrolytic solution and means are provided for cyclically flowing the solution through the container in alternating opposite directions at a flow rate sufficient to bring the particles alternately in contact with first one cathode and then the other. Anodes are disposed within the electrolytic solution around the outside of the particle container. The anodes and the cathodes are attached to a power supply and switching means are provided for switching power from one cathode to the other in synchronization with the change in the direction of flow of the solution through the screened openings. By flowing the electrolytic solution first in one direction through the screened openings and then in the other direction in a cyclic fashion, a sufficiently random motion is imparted to the particles to be coated to effectively prevent agglomeration or bridging of the particles during the coating run. This motion permits the deposition of coatings of very uniform thickness.

DESCRIPTION OF THE PREFERRED EMBODIMENTS

Figure 1:
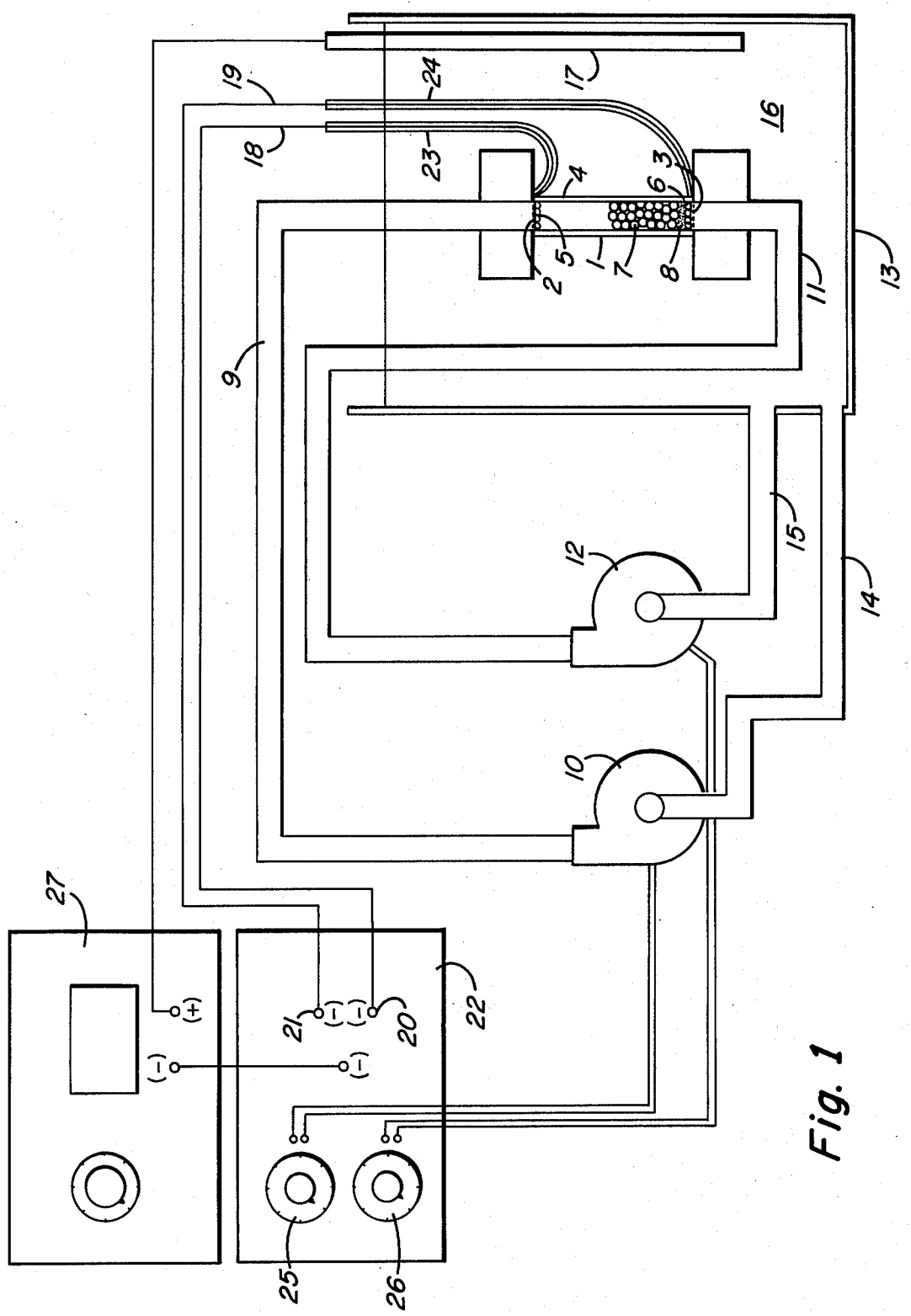
FIG. 1 is a schematic representation of apparatus useful in the practice of the invention.

Apparatus useful for electrolytic plating of metals on discrete microsized particles is shown schematically in FIG. 1. The individual particles 8 to be coated are confined in a cylindrical plating column 1, the bases of which are screens 2, 3 with interstices smaller than the smallest diameter particle to be coated. Screens 2, 3 should be formed of a nonconducting material and nylon mesh is well suited for use in these screens. The wall 4 of plating column 1 is formed of a porous material which is an electrical insulator. A preferred material for wall 4 is a porous alumina ceramic. Cathode wires 5, 6 are mounted adjacent to screens 2, 3 on the inside of plating column 1. Plating column 1 has at least one-fourth and preferably about three-fourths of its volume filled with loose packing plastic, glass, or ceramic beads 7. The size of these beads is not critical, but they should be substantially larger than the size of the particles 8 being coated. Each screened base of plating column 1 is connected to the discharge of a separate filter pump. Thus, in the schematic of FIG. 1, screen base 2 is connected by discharge line 9 to filter pump 10 while screen base 3 is connected to filter pump 12 by discharge line 11. Pumps 10, 12 are connected to plating tank 13 by return lines 14, 15 respectively. Plating column 1 is submerged in plating solution 16 in tank 13. Anodes 17 (only one of which is shown in FIG. 1), connected to power supply 27 are placed concentrically about plating column 1 within tank 13. Cathode wires 5, 6 are routed by means of leads 18, 19, respectively, to terminals 20, 21, respectively, of an electronically controlled switching device 22. Leads 18, 19 are provided with insulation 23, 24 wherever they are submerged in plating solution 16. Switching device 22 is provided with timers 25, 26 which respectively control the operation of filter pumps 10 and 12, and, simultaneously in synchronization flip the cathodic current from power supply 27 between the cathodes 5 and 6 of plating column 1. When pump 10 is ON, the individual particles 8 to be plated are forced against screen 3 and make contact with negatively charged cathode 6 and electrolytic deposition takes place. During this portion of the operating cycle, cathode wire 5 is electrically neutral and pump 12 is in the OFF position. After the elapsed time of this half cycle, pump 10 is turned OFF while pump 12 is simultaneously turned ON and the cathodic current is flipped to cathode 5. The reversal in direction of the solution flowing through plating column 1 drives the individual particles 8 to negatively active cathode wire 5 where metal deposition again occurs. The time of each half cycle is kept relatively short to reduce particle agglomeration by bridging of the deposited material. Preferably, each half cycle lasts for 5 to 30 seconds. The inert, column-packing beads 7 impose a random motion on the individual particles 8 as they move between retaining screens 2 and 3. This random, forced motion provides the necessary action to achieve a uniformly thick deposit and to provide solution turbulence within plating column 1 which separates in-motion particles 8 and which in turn serves to effectively prevent agglomeration. Wall 4 of plating column 1 is saturated with electrolyte 16 which provides the electrical path between anodes 17 and cathodes 2 and 3.

EXAMPLE I

In the apparatus of FIG. 1, a copper pyrophosphate electrolyte is used to electroplate copper onto nickel-manganese microcapsules in the size range of 180 to 210 $\mu$m in diameter. These microcapsules are commercially available under the trade name Solacells from the Solar Division of International Harvester Corporation. The electrolyte is prepared from commercially available plating salts (M&T Chemical Co. "UNICHROME" Pyrophosphate Copper Plating Process), high purity water, and reagent grade ammonium hydroxide. The major solution constituents and their concentrations are:

| Copper | 30 g/l |
|---|---|
| Pyrophosphate (as $P_2O_7^{-4}$) | 225 g/l |
| Ammonia | 2 g/l |

The operating conditions are:

| Bath temperature | 55°C |
|---|---|
| pH | 8 to 8.5 |
| Run duration | 45 min |
| Cathode current density (avg) | 1.5 A/dm² |

-continued

| Half cycle | 10 sec |
|---|---|
| Flow rate | 6 l/min |
| Amount of Solacells | 0.3 cm³ |

The average deposit thickness obtained under these conditions is 14 $\mu$m.

Example II

With the apparatus of FIG. 1, a nickel plating solution based on the Watts formulation is used to electroplate nickel onto Solacells in the 190 to 210 $\mu$m diameter size range. Two proprietary addition agents (Brightener No. 610 and Brightener No. 63, manufactured by the Udylite Corporation) are added to the bath in order to increase the brightening and leveling properties of the solution and to obtain ductile deposits. The solution is prepared from reagent grade chemicals to obtain the following composition:

| Nickel sulfate (NiSO$_4$.6H$_2$O) | 300 g/l |
|---|---|
| Nickel chloride (NiCl$_2$.6H$_2$O) | 60 g/l |
| Boric acid (H$_3$BO$_3$) | 45 g/l |
| Brightener No. 610 | 5 ml/l |
| Brightener No. 63 | 10 ml/l |

The operating conditions are:

| Bath temperature | 70°C |
|---|---|
| pH | 3.5 to 4.5 |
| Run duration | 150 min |
| Cathode current density (avg) | 1 A/dm² |
| Half Cycle | 10 sec |
| Flow rate | 6 l/min |
| Amount of Solacells | 0.5 cm³ |

Figure 2:
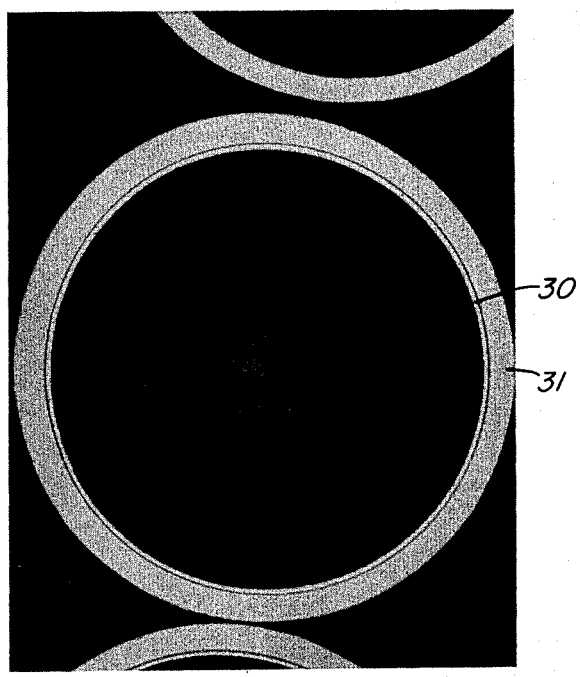
FIG. 2 is a photomicrograph of a cross section of a Solacell electrolytically plated with nickel in accordance with the process of the invention.

FIG. 2 is a photomicrograph of a cross section of a Solacell 30 with a nickel coating 31 plated in accordance with the foregoing conditions. The average deposit thickness of coating 31 is 12.5 $\mu$m.

EXAMPLE III

With the aparatus of FIG. 1, a sulfite based electrolyte (BDT-100, marketed by the Sel-Rex Company) is used to electroplate a cadmium hardened gold alloy of approximately 99.0% purity onto Solacells and metallized glass microcapsules having diameters of 50 to 210 $\mu$m. The operating conditions are:

| Metallic gold content in plating solution | 12 g/l |
|---|---|
| pH | 9.5 |
| Specific gravity | 16° Baume |
| Temperature | 55° C |
| Run duration | 360 min |
| Cathode current density | 0.1 A/dm² |

The average deposit thickness obtained under these conditions is 20 $\mu$m.

The foregoing example serve merely to exemplify the invention and are in no way intended to limit its scope. The apparatus and method of the invention may be used with any metal capable of being electroplated. The density of the microsized particles being coated is not critical and may be less than, equal to, or more than that of the plating solution. Although the microcapsules coated in the foregoing examples are spherical, the method and apparatus of the invention may also readily be used to coat discrete, microsized particles which are irregular in shape.

What I claim is:

1. Apparatus for electrolytically coating discrete microsized particles with a uniformly thick coating of a material which may be electrolytically deposited which comprises (a) means for containing a solution of an electrolyte of a material to be electrolytically deposited, (b) said solution contained in said containment means, (c) elongate porous means submerged within said solution for containing a plurality of said discrete microsized particles, said elongate means having first and second screened openings opposed therein with the interstices of said screened openings of a size which permits a substantially free flow of solution therethrough but which does not permit the passage of said discrete microsized particles therethrough, (d) first and second cathode means disposed within said elongated containment means, each of said cathode means adjacent one of said screened openings, (e) a plurality of inert beads disposed within said elongated containment means, said beads having diameters substantially larger than those of said microsized particles, (f) anode means disposed in said solution and around said elongate containment means, (g) power means connected to said first and second cathode means and said anode means for supplying power thereto, (h) means for flowing said solution cyclically through said screened openings in said elongated containment means in alternating opposite directions at a flow rate sufficient to bring said microsized particles alternately in contact with said first and second cathode means, and (i) means for switching power from said first cathode means to said second cathode means in synchronization with the change in the direction of flow of said solution through said screened openings.

2. The apparatus of claim 1 wherein said means for flowing said electrolyte cyclically through said screened openings in said elongated containment means in alternating opposite directions comprises (a) first pump means connected to said first screened opening for pumping said electrolyte through said elongate containment means in a first direction, (b) second pump means connected to said second screened opening for pumping said electrolyte through said elongate containment means in a direction opposite to said first direction, and (c) means for switching said first pump on said second pump off for a desired interval and then reversing the sequence for a desired interval and repeating the alternating sequences for a desired number of cycles.

3. The apparatus of claim 2 wherein said elongate means for containing said microsized particles is a hollow cylinder of porous nonconducting ceramic having screens across the openings of the cylinder.

4. The apparatus of claim 2 wherein said switching means has variable times for controlling the time interval for which said first or second pumping means operates during a pumping cycle.

* * * * *